(12) United States Patent
Wang et al.

(10) Patent No.: US 12,487,467 B2
(45) Date of Patent: Dec. 2, 2025

(54) OPTICAL SYSTEM AND DISPLAY DEVICE

(71) Applicant: Beijing Zitiao Network Technology Co., Ltd., Beijing (CN)

(72) Inventors: Yuanpeng Wang, Beijing (CN); Sheng Luo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 359 days.

(21) Appl. No.: 18/338,511

(22) Filed: Jun. 21, 2023

(65) Prior Publication Data
US 2023/0418080 A1    Dec. 28, 2023

(30) Foreign Application Priority Data
Jun. 22, 2022    (CN) .......................... 202210713736.8

(51) Int. Cl.
| G02B 27/09 | (2006.01) |
| G02B 5/30 | (2006.01) |
| G02B 13/18 | (2006.01) |
| G02B 27/01 | (2006.01) |

(52) U.S. Cl.
CPC ....... *G02B 27/0955* (2013.01); *G02B 5/3083* (2013.01); *G02B 13/18* (2013.01); *G02B 27/0172* (2013.01); *G02B 2027/0123* (2013.01)

(58) Field of Classification Search
CPC .. G02B 27/0955; G02B 5/3083; G02B 13/18; G02B 27/0172; G02B 2027/0123
USPC .......................................................... 359/708
See application file for complete search history.

(56) References Cited

U.S. PATENT DOCUMENTS

| 2020/0081234 A1* | 3/2020 | Etter ....................... G02B 5/305 |
| 2023/0143390 A1* | 5/2023 | Chen ....................... G02B 17/08 |
| | | 359/362 |
| 2023/0341697 A1* | 10/2023 | Chen ....................... G02B 27/28 |
| 2024/0118535 A1* | 4/2024 | Friedman ........... G02B 26/0825 |
| 2024/0219697 A1* | 7/2024 | Le ......................... G02B 5/3033 |
| 2024/0302658 A1* | 9/2024 | Sun ..................... G02B 27/0172 |
| 2024/0310630 A1* | 9/2024 | Wong ................. G02B 27/0172 |

* cited by examiner

*Primary Examiner* — Stephone B Allen
*Assistant Examiner* — Boutsikaris Leonidas
(74) *Attorney, Agent, or Firm* — Alleman Hall & Tuttle LLP (57) ABSTRACT

An optical system and a display device are provided. The optical system includes an optic group, a polarizing transflective film, a phase retardation film, and a transflective film. The optic group includes a first optic and a second optic; the polarizing transflective film and the phase retardation film are on one side of the optic group, the transflective film is on the other side of the optic group. The first optic includes a plane surface and a first aspheric surface having a curvature radius of −120 mm to −140 mm, the second optic includes a second aspheric surface having a curvature radius of −175 mm to −185 mm and a third aspheric surface having a curvature radius of −100 mm to −110 mm; a focal length of the optical system is 26 mm to 30 mm, an effective aperture of the optic group is 55 μm to 58 μm.

17 Claims, 6 Drawing Sheets

OPTICAL SYSTEM AND DISPLAY DEVICE

CROSS-REFERENCE TO RELATED APPLICATION

The present application claims priority of Chinese Patent Application No. 202210713736.8, filed on Jun. 22, 2022, the disclosure of which is incorporated herein by reference in its entirety as part of the present application.

TECHNICAL FIELD

Embodiments of the present disclosure relate to an optical system and a display device.

BACKGROUND

Virtual Reality (VR) technology utilizes computers to generate a simulation environment, and utilizes multi-source information fusion to form an interactive three-dimensional scene, so that users can immerse themselves in the environment. With the gradual popularization of virtual reality products, users have increasingly higher requirements for usage of virtual reality products. Therefore, virtual reality display devices with display effect of wide field of view (FOV) and small volume have become the mainstreams.

SUMMARY

Embodiments of the present disclosure relate to an optical system and a display device.

An Embodiment of the present disclosure provides an optical system including an optic group, a polarizing transflective film, a phase retardation film, and a transflective film. The optic group includes a first optic and a second optic which are arranged one on top of the other; the polarizing transflective film is arranged at a side of the first optic away from the second optic; the transflective film is arranged at a side of the second optic away from the first optic. The first optic includes a plane surface and a first aspheric surface, and the second optic includes a second aspheric surface and a third aspheric surface, the second aspheric surface is located at a side of the first aspheric surface away from the plane surface, and the third aspheric surface is located at a side of the second aspheric surface away from the first optic; both of the first aspheric surface and the third aspheric surface are convex surfaces, the second aspheric surface is a concave surface, and a side of the plane surface away from the first aspheric surface is a light exiting side of the optic group; and a focal length of the optical system is 26 mm to 30 mm, an effective aperture of the optic group is 55 μm to 58 μm, a curvature radius of the first aspheric surface is −120 mm to −140 mm, a curvature radius of the second aspheric surface is −175 mm to −185 mm, and a curvature radius of the third aspheric surface is −100 mm to −110 mm.

For example, according to an embodiment of the present disclosure, a maximum thickness of the first optic is 4 mm to 6 mm, a maximum thickness of the second optic is 3.5 mm to 5.5 mm, and a distance between the first optic and the second optic is 2 mm to 6 mm.

For example, according to an embodiment of the present disclosure, an eye relief of the optical system is 13 mm to 21 mm.

For example, according to an embodiment of the present disclosure, the eye relief of the optical system is not smaller than 15 mm.

For example, according to an embodiment of the present disclosure, a maximum angle of field of view (FOV) of the optical system is 100° to 110°.

For example, according to an embodiment of the present disclosure, a focal length of the first optic is 220 mm to 250 mm, and a focal length of the second optic is 400 mm to 450 mm.

For example, according to an embodiment of the present disclosure, a refractive index of the first optic is the same as a refractive index of the second optic.

For example, according to an embodiment of the present disclosure, the refractive index of the first optic and the refractive index of the second optic both are 1.5 to 1.6.

For example, according to an embodiment of the present disclosure, a radius of a spot in a spot diagram of the optical system for central field of view (FOV) is smaller than a radius of an Airy spot of the optical system.

For example, according to an embodiment of the present disclosure, the phase retardation film and the polarizing transflective film are attached onto the plane surface.

An Embodiment of the present disclosure provides a display device, which includes a display screen and the optical system as mentioned above, the display screen is located at a side of the second optic away from the first optic.

For example, according to an embodiment of the present disclosure, a distance between the third aspheric surface and a display surface of the display screen is 12 mm to 15 mm.

For example, according to an embodiment of the present disclosure, a distance between the plane surface and the display surface is 24 mm to 26 mm.

For example, according to an embodiment of the present disclosure, a size of a display surface of the display screen is 2 inches to 3 inches.

The optical system provided by the embodiments of the present disclosure can be an optical system adopting a folded optical path (Pancake), in which a polarizing transflective film and a phase retardation film are arranged at one side of an optic group, and a transflective film is arranged at the other side of the optic group; meanwhile, by configuring the optic group as a duel-optic structure including three aspheric surfaces and one plane surface, and by setting an effective aperture of the optic group, a curvature radius of each aspheric surface and a focal length of the optical system, the optical system can achieve ultra-short focal length, ultra-short total track length (TTL) and wide FOV display with large eye relief, thereby improving an usage experience of users.

BRIEF DESCRIPTION OF DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In the research, inventor (s) of the present application found that an eye relief (ERF) of existing virtual reality (VR) products with folded optical path (Pancake) is generally 13 mm to 15 mm in order to realize a viewing effect with wide field of view (FOV). However, such eye relief is difficult to meet the usage requirements of myopia users wearing glasses, which further affects the experience of users.

Embodiments of the present disclosure provide an optical system and a display device. The optical system includes an optic group, a polarizing transflective film, a phase retardation film and a transflective film. The optic group includes a first optic and a second optic which are arranged one on top of the other; the polarizing transflective film is arranged at a side of the first optic away from the second optic; the phase retardation film is arranged between the polarizing transflective film and the first optic; the transflective film is arranged at a side of the second optic away from the first optic. The first optic includes a plane surface and a first aspheric surface; the second optic includes a second aspheric surface and a third aspheric surface, the second aspheric surface is located at a side of the first aspheric surface away from the plane surface; and the third aspheric surface is located at a side of the second aspheric surface away from the first optic; both of the first aspheric surface and the third aspheric surface are convex surfaces, the second aspheric surface is a concave surface, and a side of the plane surface away from the first aspheric surface is a light exiting side of the optic group; a focal length of the optical system is 26 mm to 30 mm, an effective aperture of the optic group is 55 µm to 58 µm, a curvature radius of the first aspheric surface is −120 mm to −140 mm, a curvature radius of the second aspheric surface is −175 mm to −185 mm, and a curvature radius of the third aspheric surface is −100 mm to −110 mm. The optical system provided by the embodiments of the present disclosure can be an optical system adopting a folded optical path (Pancake), in which the polarizing transflective film, the phase retardation film and the transflective film are arranged at both sides of the optic group; meanwhile, by configuring the optic group as a dual-optic structure including aspheric surfaces, and by setting an effective aperture of the optic group, a curvature radius of each aspheric surface and a focal length of the optical system, the optical system can achieve ultra-short focal length, ultra-short total track length (TTL) and wide FOV display with large eye relief, thereby improving the usage experience of users.

The optical system and the display device provided by the embodiments of the present disclosure are described below with reference to the drawings.

Figure 1:
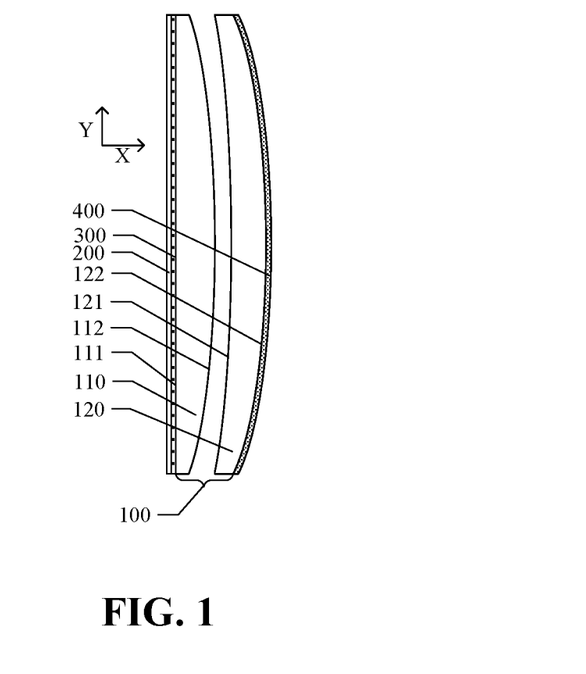
FIG. 1 is a schematic structural diagram of an optical system provided according to an embodiment of the present disclosure.
Figure 2:
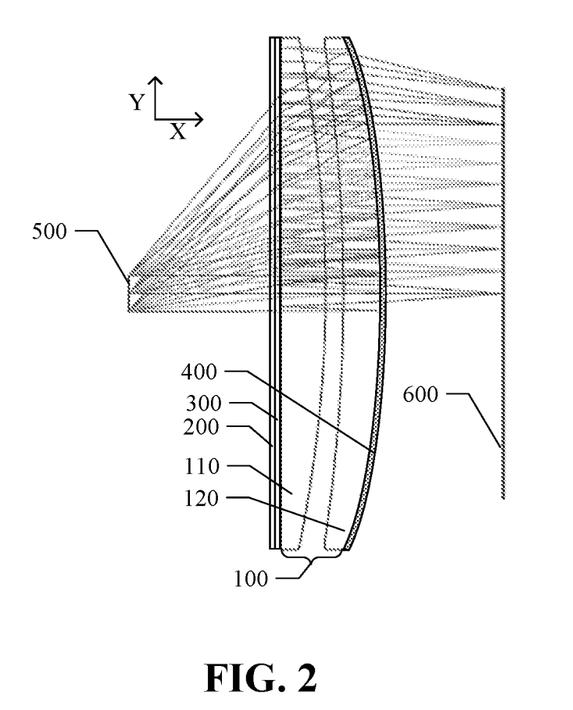
FIG. 2 is a simplified diagram of an optical path of the optical system illustrated in FIG. 1.

FIG. 1 is a schematic structural diagram of an optical system provided according to an embodiment of the present disclosure, and FIG. 2 is a simplified diagram of an optical path of the optical system illustrated in FIG. 1. As illustrated in FIGS. 1 and 2, the optical system includes an optic group 100, a polarizing transflective film 200, a phase retardation film 300 and a transflective film 400. As illustrated in FIGS. 1 and 2, the optic group 100 includes a first optic 110 and a second optic 120 which are arranged one on top of the other; the polarizing transflective film 200 is arranged at a side of the first optic 110 away from the second optic 120; the phase retardation film 300 is arranged between the polarizing transflective film 200 and the first optic 110; the transflective film 400 is arranged at a side of the second optic 120 away from the first optic 110. The first optic 110 includes a plane surface 111 and a first aspheric surface 112; the second optic 120 includes a second aspheric surface 121 and a third aspheric surface 122, the second aspheric surface 121 is located at a side of the first aspheric surface 112 away from the plane surface 111, and the third aspheric surface 122 is located at a side of the second aspheric surface 121 away from the first optic 110; both of the first aspheric surface 112 and the third aspheric surface 122 are convex surfaces, and the second aspheric surface 121 is a concave surface; a side of the plane surface 111 away from the first aspheric surface 112 is a light exiting side; a focal length of the optical system is 26 mm to 30 mm, an effective aperture of the optic group 100 is 55 µm to 58 µm, a curvature radius of the first aspheric surface 112 is −120 mm to −140 mm, a curvature radius of the second aspheric surface 121 is −175 mm to −185 mm, and a curvature radius of the third aspheric surface 122 is −100 mm to −110 mm.

The optical system provided by the embodiments of the present disclosure can be an optical system adopting a folded optical path (Pancake), in which the polarizing transflective film and the phase retardation film are arranged at one side of the optic group, and the transflective film is arranged at the other side of the optic group; meanwhile, by configuring the optic group as a duel-optic structure including three aspheric surfaces and one plane surface, and by setting the effective aperture of the optic group, the curvature radius of each aspheric surface and the focal length of the optical system, the optical system can achieve ultra-short focal length, ultra-short total track length (TTL) and wide FOV display with large eye relief, thereby improving an usage experience of users.

For example, the polarizing transflective film 200 and the phase retardation film 300 are located at a near-to-eye side of the optic group 100, and the transflective film 400 is located at a near-to-image source side of the optic group 100. For example, the polarizing transflective film 200 and the phase retardation film 300 are arranged at a side of the plane surface 111 of the first optic 110 away from the first aspheric surface 112, and the transflective film 400 is arranged at a side of the third aspheric surface 122 of the second optic 120 away from the second aspheric surface 121.

In some examples, the phase retardation film 300 and the polarizing transflective film 200 may be attached, as a composite film layer, onto the plane surface 111 of the first optic 110. In the optical system provided by the present disclosure, a surface of the first optic at the near-to-eye side is configured as a plane surface, so that a bonding process of the above-mentioned composite film layer is easier to realize, and meanwhile an optical performance of the phase retardation film and the polarizing transflective film can be less affected.

For example, the transflective film 400 may be coated or plated onto the third aspheric surface 122.

For example, as illustrated in FIGS. 1 and 2, the polarizing transflective film 200 may include a polarizing transmissive film and a reflective polarization film, and the polarizing transmissive film is located at a side of the reflective polarization film away from the phase retardation film 300.

For example, the polarizing transflective film 200 and the phase retardation film 300 constitute a polarizing device with folded optical path, also known as a composite film. For example, the composite film is attached onto the plane surface 111 of the optic group 100.

For example, the reflective polarization film functions for transmitting polarized light in one direction (such as S-linearly polarized light) and reflecting polarized light in another direction (such as P-linearly polarized light). For example, the reflective polarization film (also referred to as polarization splitting film) possesses the following characteristics: a plane of the film contains an optical axis direction, and a transmittance (parallel transmittance) of a polarized component of incident light parallel to this direction is greater than 80%. For example, the parallel transmittance is greater than 85%. At the same time, a reflectivity (parallel reflectivity) of this component is smaller than 5%. For example, the parallel reflectivity is smaller than 1%. A transmittance (orthogonal transmittance) of a polarized component of the incident light perpendicular to this direction is smaller than 0.5%. For example, the orthogonal transmittance is smaller than 0.1%. At the same time, a reflectivity (orthogonal reflectivity) of this component is greater than 80%. For example, the orthogonal reflectivity is greater than 85%. For example, the reflective polarization film may be a plastic reflective film.

For example, a transmission axis of the polarizing transmission film is parallel to a transmission axis of the reflective polarization film. For example, the polarizing transmission film can be a linearly polarized film used for further filtering other stray light, so that only polarized light (such as S-linearly polarized light) passing through the polarizing transflective film is allowed to enter human eyes.

For example, as illustrated in FIGS. 1 and 2, the phase retardation film 300 is configured such that the light transmitted there-through can be converted between a circular polarization state and a linear polarization state. For example, the phase retardation film 300 may be a quarter wave plate.

For example, as illustrated in FIGS. 1 and 2, the transflective film 400 can be configured to reflect a part of light and transmit another part of light.

As illustrated in FIG. 2, a folded optical path can be constituted by adopting the polarizing transflective film 200, the phase retardation film 300 and the transflective film 400 as described above, and the principle of the folded optical path is as follows: a wave plate can be arranged at a display surface 600 of a display screen located at a side of the second optic 120 away from the first optic 110, image light emitted from the display surface 600 is converted into right-handed circularly polarized light after passing through the wave plate, and the right-handed circularly polarized light remains its polarization state unchanged after transmitting through the transflective film 400. The light enters the optic group 100 and is transmitted through the first optic 110 and the second optic 120, and then reaches the phase retardation film 300. The right-handed circularly polarized light incident on the phase retardation film 300 is converted into P-linearly polarized light, and the P-linearly polarized light is reflected back to the phase retardation film 300 by the polarizing transflective film 200, where a first time of reflection occurs. Afterwards, the P-linearly polarized light passes through the phase retardation film 300 and is converted into right-handed circularly polarized light. The right-handed circularly polarized light is transmitted through the optic group 100 and then reaches the transflective film 400, where a second time of reflection occurs. Due to a half-wave loss, the reflected light is converted from right-handed circularly polarized light to left-handed circularly polarized light. The left-handed circularly polarized light reaches the phase retardation film 300 after transmitting through the optic group 100, and is converted into S-linearly polarized light after transmitting through the phase retardation film 300; and then the S-linearly polarized light is emitted towards an exit pupil 500 such as human eyes after transmitting through the polarizing transflective film 200.

The above-described folded optical path can change a polarization state of the light propagating between the polarizing transflective film and the transflective film, and is folded due to, for example, the addition of two times of reflections by means of the arrangement of the polarizing transflective film, the phase retardation film and the transflective film as described above, thus greatly compressing the space required between human eyes and the optical system, and achieving a smaller and lighter optical system.

For example, the transflective film 400 is arranged at the side of the second optic 120 away from the first optic 110, so that the light can pass through the aspheric surface of the second optic 120 close to the first optic 110 in the process of reflection, which is beneficial to improving the freedom degree of optical design and optimizing the imaging effect.

For example, the first optic 110 and the second optic 120 both are lenses.

For example, the first aspheric surface 112 is bent towards a side away from the plane surface 111 to form a convex surface, the second aspheric surface 121 is bent towards a side close to the third aspheric surface 122 to form a concave surface, and the third aspheric surface 122 is bent towards a side away from the second aspheric surface 121 to form a convex surface.

For example, a curvature radius of the first aspheric surface 112 can be −125 mm to −135 mm, a curvature radius of the second aspheric surface 121 can be −178 mm to −183 mm, and a curvature radius of the third aspheric surface 122 can be −102 mm to −108 mm. For example, the curvature radius of the first aspheric surface 112 can be −128 mm to −133 mm, the curvature radius of the second aspheric surface 121 can be −180 mm to −182 mm, and the curvature radius of the third aspheric surface 122 can be −103 mm to −105 mm. For example, the curvature radius of the first aspheric surface 112 may be −131 mm, the curvature radius of the second aspheric surface 121 may be −181 mm, and the curvature radius of the third aspheric surface 122 may be −104 mm.

For example, as illustrated in FIGS. 1 and 2, each aspheric surface may be an even aspheric surface (EVENASPH), and the curvature radius of each aspheric surface is a curvature radius of a base sphere on its surface. The above-mentioned "base sphere" means that the aspheric surface is formed by further deforming on the basis of a spherical surface, and the spherical surface used as the basis of the aspheric surface is the base sphere of the aspheric surface.

For example, in the case where the surface of each optic includes an aspheric surface, the aspheric surface can be made into an aspheric surface by grinding and machining, and a glass mold through which glass can be formed into an aspheric shape may have an aspheric surface or a resin on a surface of the glass mold may be formed into an aspheric surface.

For example, a focal length of the optical system can be 26.5 mm to 28.5 mm. For example, the focal length of the optical system can be 27 mm to 29 mm. For example, the focal length of the optical system can be 28.5 mm to 29.5 mm.

In some examples, as illustrated in FIGS. 1 and 2, a focal length of the first optic 110 is 220 mm to 250 mm, and a focal length of the second optic 120 is 400 mm to 450 mm. For example, the focal length of the first optic 110 is 225 mm to 245 mm, and the focal length of the second optic 120 is 410 mm to 440 mm. For example, the focal length of the first optic 110 is 230 mm to 240 mm, and the focal length of the second optic 120 is 420 mm to 430 mm. The focal length of the above optics refers to the focal length when there is no plated film on the surface of each optic.

In some examples, as illustrated in FIGS. 1 and 2, a maximum thickness of the first optic 110 is 4 mm to 6 mm, a maximum thickness of the second optic 120 is 3.5 mm to 5.5 mm, and a distance between the first optic 110 and the second optic 120 is 2 mm to 6 mm. For example, the maximum thickness of the first optic 110 is 4.5 mm to 5.5 mm, the maximum thickness of the second optic 120 is 3.7 mm to 5.2 mm, and the distance between the first optic 110 and the second optic 120 is 2 mm to 5 mm. For example, the maximum thickness of the first optic 110 is 4.8 mm to 5.2 mm, the maximum thickness of the second optic 120 is 3 mm to 5 mm, and the distance between the first optic 110 and the second optic 120 is 3 mm to 4 mm. For example, the maximum thickness of the first optic 110 is 5 mm, the maximum thickness of the second optic 120 is 4.5 mm, and the distance between the first optic 110 and the second optic 120 is 2 mm.

For example, a central thickness of the first optic 110 on the optical axis is 4 mm to 6 mm, a central thickness of the second optic 120 on the optical axis is 3.5 mm to 5.5 mm, and a distance between the first aspheric surface 112 of the first optic 110 and the second aspheric surface 121 of the second optic 120 on the optical axis is 2 mm to 6 mm.

By setting the distance between the first optic and the second optic to be relatively larger, it provides a greater freedom in arrangement of positions of the first optic and the second optic, which reduces the requirement of alignment accuracy. By setting the thickness of the first optic to be no more than 6 mm and by setting the thickness of the second optic to be no more than 5.5 mm, it's beneficial to reducing the size of the optic group on the optical axis. The optic group of the optical system provided by this embodiment has a small size along the optical axis direction thereof, so that the size of the optical system can be reduced, for example, the total track length (TTL) of the optical system can be reduced to improve the compactness of a display device including the optical system.

In some examples, as illustrated in FIGS. 1 and 2, a refractive index of the first optic 110 is as same as that of the second optic 120. The smaller the difference in refractive index between the first optic and the second optic, the smaller the deflection degree of light passing through the first optic and the second optic; in this way, less stray light is generated after the reflection of the transflective film. In the optical system provided by the present disclosure, the first optic and the second optic have the same refractive index, and the difference in refractive index between the first optic and the second optic can be minimized to reduce the stray light.

In some examples, as illustrated in FIGS. 1 and 2, the refractive index of the first optic 110 and the refractive index of the second optic 120 are both 1.5-1.6. For example, the refractive index of the first optic 110 and the refractive index of the second optic 120 may both be 1.52 to 1.58. For example, the refractive index of the first optic 110 and the refractive index of the second optic 120 may both be 1.53 to 1.57. For example, the refractive index of the first optic 110 and the refractive index of the second optic 120 may both be 1.54 to 1.56. For example, the refractive index of the first optic 110 and the refractive index of the second optic 120 may both be 1.55.

For example, a material of the first optic 110 is as same as a material of the second optic 120. For example, the material of the first optic 110 and the material of the second optic 120 are both optical resins, including, for example, cycloolefin copolymer (COC), such as APL5013VH with a refractive index of 1.555.

According to the optical structure provided by the present disclosure, an optical system with ultra-short focal length can be realized by cooperating the focal length, the thickness, and the refractive index of the first optic and the curvature radius of the aspheric surface of the first optic as well as the focal length, the thickness, and the refractive index of aspheric surface of the second optic and the curvature radius of the aspheric surface of the second optic with the above-mentioned film layers constituting the folded optical path.

For example, an effective aperture of the optic group 100 refers to a maximum aperture which allows light to pass through the optic group 100, and is determined by a maximum luminous flux of the optic group 100. For example, the effective aperture of the first optic 110 may be as same as that of the second optic 120, for example, both are 55 μm, or 56 μm, or 57 μm, or 58 μm. For example, the effective aperture of the optic group 100 may be 55.5 μm to 57.5 μm. For example, the effective aperture of the optic group 100 may be 56.5 μm to 57.4 μm. Of course, the embodiments of the present disclosure are not limited to this, and the effective aperture of the first optic and the effective aperture of the second optic may also be different from each other.

For example, the effective aperture of the optic group 100 may have the same value of effective aperture or different values of effective aperture in various directions perpendicular to the optical axis, which may be set according to requirements of products.

The size of the effective aperture of the above-described optics may be configured such that it not only ensures a small size of the optics in the direction perpendicular to the optical axis but also meets the requirements of FOV range.

For example, as illustrated in FIG. 2, a side of the first optic 110 away from the second optic 120 includes an exit pupil 500. For example, a diameter of the exit pupil can be 4 mm.

For example, in the process of parameter optimization of the optical system, an imaging surface 600 of the optical system is located at a side of the second optic 120 away from the first optic 110; however, in the case where the optical system is used in a display device, the above-mentioned imaging surface 600 is at a position where a display surface of a display screen is located. For example, a side of the second optic 120 away from the first optic 110 may be provided with a display surface 600 for displaying images. For example, an image distance of a virtual image formed by the optical system can be 1200 mm to 2000 mm, such as 1300 mm to 1900 mm, e.g., 1500 mm to 1800 mm.

In some examples, as illustrated in FIGS. 1 and 2, an eye relief of the optical system is 13 mm to 21 mm. For example, a distance between the plane surface 111 of the first optic 110 and the exit pupil 500 may be 13 mm to 21 mm.

In some examples, as illustrated in FIGS. 1 and 2, the eye relief of the optical system is not smaller than 15 mm. For example, the eye relief of the optical system can be 16 mm to 21 mm. For example, the eye relief of the optical system can be 17 mm to 19 mm. For example, the eye relief of the optical system can be 18 mm to 20 mm.

In some examples, a maximum angle of FOV of the optical system is 100° to 110°. For example, the maximum angle of FOV of the optical system is 100° to 106°. For example, the maximum angle of FOV of the optical system is 101° to 105°. For example, the maximum angle of FOV of the optical system is 102° to 104°. For example, the maximum angle of FOV of the optical system is 107° to 109°.

According to the optical system provided by the present disclosure, by configuring the optic group to be cooperated with the above-described folded optical path while configuring the optic group as a combination of the first optic including the aspheric surface and the second optic including the aspheric surface, and by setting parameters such as the focal length of the optical system, the focal length of each optic, the effective aperture of each optic, the curvature radius of the aspheric surface of each optic, the thickness of each optic, the distance between the two optics and the refractive index of each optic, the maximum angle of FOV of the optical system can reach 100° to 110° while the eye relief can reach 13 mm to 21 mm, even not smaller than 15 mm, based on a small size of the optical system, which is beneficial to improving the user's experience, such as meeting the needs of myopia users wearing glasses.

For example, the aspheric surface structure is expressed by the following numerical formula:

$$z = \frac{CY^2}{1 + \sqrt{1 - (1+k)C^2 Y^2}} + \sum_{i=2}^{N} \alpha_i Y^{2i}.$$

For example, in the above formula, Y is a height of the aspheric surface in the direction perpendicular to the optical axis, and z is a distance between a projection of a vertex of the aspheric surface on the optical axis and a projection of a position at the height Y of the aspheric surface on the optical axis, that is, z is a coordinate along the optical axis; C is a curvature (a reciprocal of the curvature radius R), k is a coin constant, $\alpha_i$, is the coefficient of various higher-order terms, and 2i is the order of aspheric coefficient.

In practice, upon optimizing reasonable configuration of parameters of each optic, the curvature radius, the cone coefficient, the height and the aspheric coefficient of the optic group are substituted into the above numerical formula, and optimized parameters that can calibrate the aberration of the optics are obtained through optical simulation and calculation. By means of the optimization process, the optimal values of the curvature radius of each aspheric surface of the optic group, the thickness of each optic along the optical axis, the distance between the two optics, the effective aperture of the optic group, the conic coefficient of each aspheric surface and the higher-order coefficient of even aspheric surface are obtained.

TABLE 1

| optical surface | type | curvature radius | distance | material | radius | cone coefficient |
|---|---|---|---|---|---|---|
| object plane | normal surface | infinite | −2000 | — | 2514.34 | 0 |
| stop | normal surface | infinite | 17 | — | 2.00 | 0 |
| 2 | normal surface | infinite | 5 | APL5013VH | 28.65 | 0 |
| 3 | even aspheric surface | −1.31E+002 | 2 | — | 28.65 | −3.00E+000 |
| 4 | even aspheric surface | −1.81E+002 | 4.5 | APL5013VH | 28.65 | −3.00E+000 |
| 5 | even aspheric surface | −1.04E+002 | 1.32E+001 | — | 28.65 | 9.96E−001 |
| image plane | normal surface | infinite | — | — | 23 | 0 |

TABLE 2

| optical surface | type | a2 | a4 | a6 | a8 | a10 | a12 | a14 |
|---|---|---|---|---|---|---|---|---|
| object plane | normal surface | — | — | — | — | — | — | — |
| stop | normal surface | — | — | — | — | — | — | — |

TABLE 2-continued

| optical surface | type | a2 | a4 | a6 | a8 | a10 | a12 | a14 |
|---|---|---|---|---|---|---|---|---|
| 2 | normal surface | — | — | — | — | — | — | — |
| 3 | even aspheric surface | — | 8.00E−008 | — | — | — | — | — |
| 4 | even aspheric surface | — | 4.51E−008 | — | — | — | — | — |
| 5 | even aspheric surface | — | −1.83E−008 | 6.95E−010 | −1.18E−012 | 1.10E−015 | −3.99E−019 | — |
| image plane | normal surface | — | — | — | — | — | — | — |

For example, Table 1 and Table 2 listed above schematically illustrate the sequence numbers of optical surfaces (Surfaces) which are sequentially numbered from the human eyes (STOP) to the display screen, the curvature radius (R) of each optical surface on the optical axis, and the distance (T) between each surface on the optical axis from the human eyes (STP) to the display screen and an optical surface immediately following the surface. The optical surface 2 represents the plane surface 111 of the first optic 110, the optical surface 3 represents the first aspheric surface 112 of the first optic 110, the optical surface 4 represents the second aspheric surface 121 of the second optic 120, and the optical surface 5 represents the third aspheric surface 122 of the second optic 120.

For example, each of the first aspheric surface 112, the second aspheric surface 121 and the third aspheric surface 122 may be an even aspheric surface.

For example, the conic coefficients of the first aspheric surface 112 and the second aspheric surface 121 may be −5 to −1. For example, the conic coefficient of the first aspheric surface 112 may be as same as that of the second aspheric surface 121. For example, the conic coefficient of the third aspheric surface 122 may be 0.001 to 2.

For example, the conic coefficient of the first aspheric surface 112 may be −3. For example, the conic coefficient of the second aspheric surface 121 may be −3. For example, the conic coefficient of the third aspheric surface 122 may be 0.996.

For example, as illustrated in FIGS. 1 to 2 and Tables 1 to 2, the curvature radius of the first aspheric surface 112 is −131 mm, the curvature radius of the second aspheric surface 121 is −181 mm, and the curvature radius of the third aspheric surface 122 is −104 mm; the image distance of the virtual image formed by the optical system is 2000 mm, the eye relief is 17 mm, the thickness of the first optic 110 is 5 mm, the distance between the first optic 110 and the second optic 120 is 2 mm, the thickness of the second optic 120 is 4.5 mm, and the distance between the third aspheric surface 122 and the display surface 600 of the display screen is 13.2 mm; the materials of the first optic 110 and the second optic 120 both are APL5013VH; half of the diameter of the exit pupil is 2 μm, half of the effective aperture of the first optic 110 and the second optic 120 is 28.65 μm, half of the size of the imaging surface is 23 mm, and half of the size of the virtual image is 2514.34 mm; the first aspheric surface 112 has a conic coefficient of −3, the second aspheric surface 121 has a conic coefficient of −3, and the third aspheric surface 122 has a conic coefficient of 0.996; the even aspheric coefficients corresponding to the first aspheric surface 112 are $a_2=0$, $a_4=8.00E-008$, $a_6=a_8=a_{10}=a_{12}=a_{14}=0$, in sequence; the even aspheric coefficients corresponding to the second aspheric surface 121 are $a_2=0$, $a_4=4.51E-008$, $a_6=a_8=a_{10}=a_{12}=a_{14}=0$, in sequence; the even aspheric coefficients corresponding to the third aspheric surface 122 are $a_2=0$, $a_4=-1.83E-008$, $a_6=6.95E-010$, $a_8=-1.18E-012$, $a_{10}=1.10E-015$, $a_{12}=-3.99E-019$ and $a_{14}=0$, in sequence.

The optical system provided by the present disclosure adopts the optic group including the first optic and the second optic, which can increase the degree of freedom of optical design. At the same time, by optimizing the eye relief, the thickness of each optic, the distance between the optic group and the display surface of the display screen, the refractive index of each optic, the curvature radius of each aspheric surface, the conic coefficients corresponding to each aspheric surface and the even aspheric coefficient, an optical system with wide FOV and good imaging effect under long eye relief can be obtained.

Figure 3:
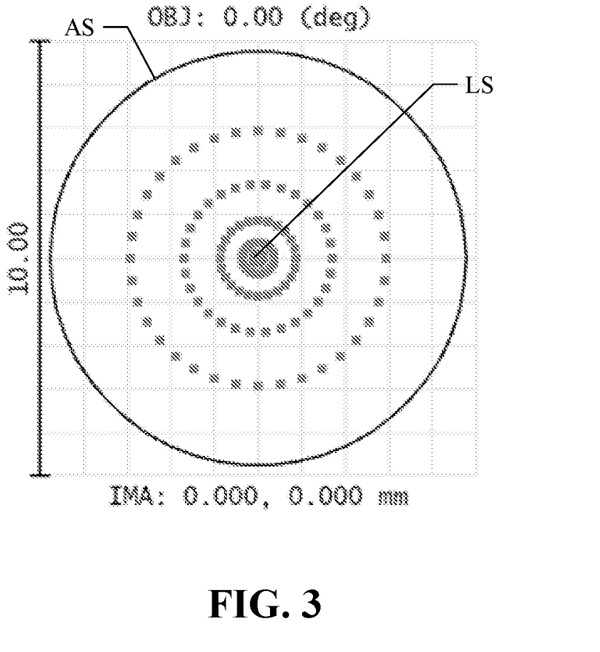
FIG. 3 is a spot diagram of an optical system for central field of view (FOA) of a single wavelength.
Figure 4:
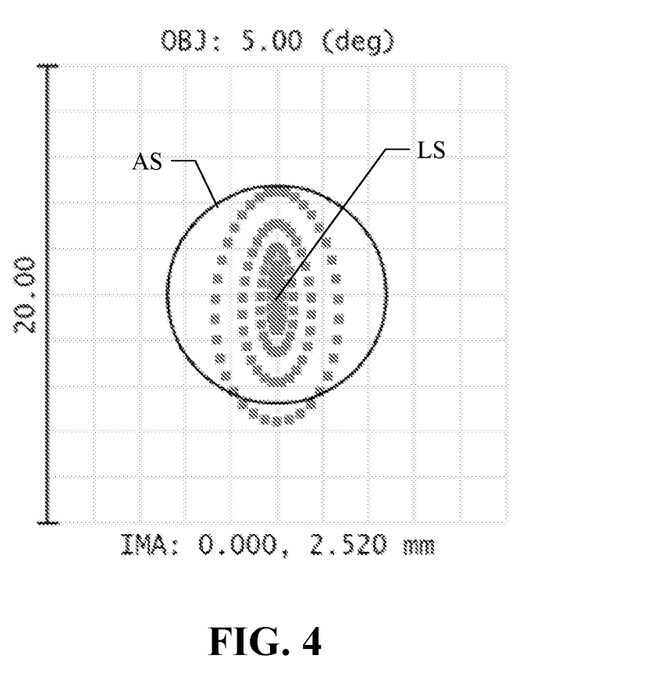
FIG. 4 is a spot diagram of an optical system for half FOV of 5° of a single wavelength.
Figure 5:
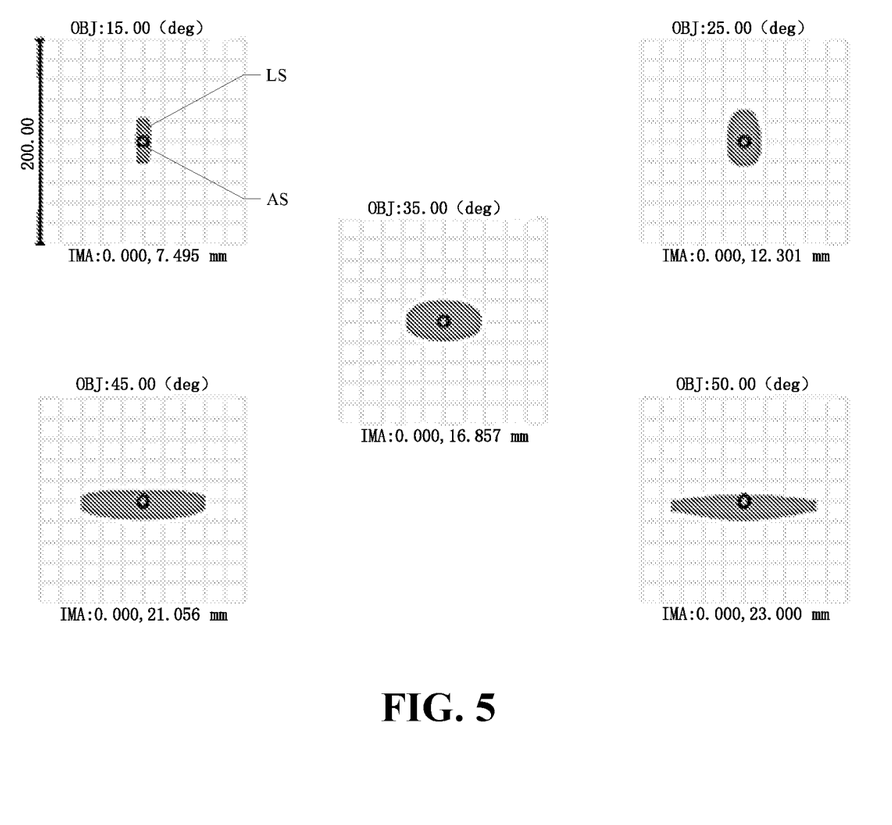
FIG. 5 is a spot diagram for other half FOVs of a single wavelength.
Figure 6:
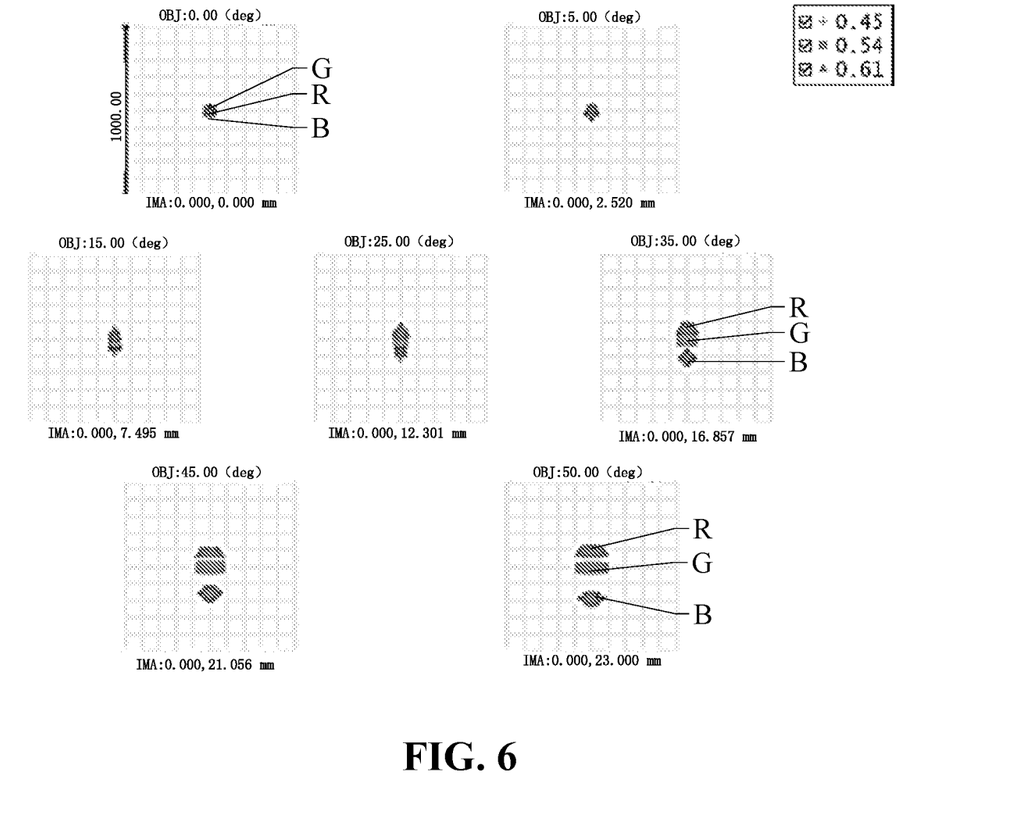
FIG. 6 is a spot diagram of the optical system for different half FOVs of wavelengths of light of three colors of red, green and blue.

FIG. 3 is a spot diagram of the optical system for central FOV of a single wavelength, FIG. 4 is a spot diagram of the optical system for half FOV of 5° of a single wavelength, FIG. 5 is a spot diagram for other half FOVs of a single wavelength, and FIG. 6 is a spot diagram of the optical system for different half FOVs of wavelengths of light of three colors of red, green and blue.

Airy spot is the concept under physical optics, and refers to that the optical system can be considered as an ideal optical system when a diameter of a diffused spot as formed is within (2.44*F*λ). The "F" indicates the aperture value, and the "λ" indicates the principle wavelength.

In some examples, as illustrated in FIG. 3, the radius of the spot in the spot diagram of the optical system for central FOV (0°) is smaller than the radius of the Airy spot of the optical system.

For example, as illustrated in FIG. 3, the spot LS of the spot diagram of the optical system for central FOV (0°) has a radius of 1.81 μm, and the Airy spot AS of the optical system has a radius of 4.76 μm. The spot in the spot diagram for central FOV of the optical system provided by the present disclosure is completely located within an Airy spot ring, so that the optical system achieves a good image quality.

For example, the above-mentioned radius of spot refers to a minimum root mean square radius (RMS). For example, the spot diagrams illustrated in FIGS. 3 to 5 are spot diagrams for different half FOVs of a wavelength of 540 nm.

For example, as illustrated in FIG. 4, the radius of the spot LS in the spot diagram for half FOV of 5° is 2.66 μm, which is smaller than the radius of the Airy spot AS of the optical system.

For example, as illustrated in FIG. 5, the radius of the spot LS in the spot diagram for half FOV of 15° is 8.737 µm. For example, the radius of the spot in the spot diagram for half FOV of 25° is 12.804 µm. For example, the radius of the spot in the spot diagram for half FOV of 35° is 18.278 µm. For example, the radius of the spot in the spot diagram for half FOV of 45° is 30.022 µm. For example, the radius of the spot in the spot diagram for half FOV of 50° is 35.247 µm.

For example, as illustrated in FIG. 6, the spot LS in the spot diagram of the optical system for central FOVs of wavelengths of light of three colors of red light (R), green light (G) and blue light (B) has a radius of 3.825 µm, which is smaller than the radius of Airy spot, and the spot in the spot diagram for central FOA is completely located within the Airy spot ring. For example, the central wavelength of red light may be 610 nm, the central wavelength of green light may be 540 nm, and the central wavelength of blue light may be 450 nm.

For example, as illustrated in FIG. 6, the radius of the spot in the spot diagram for half FOV of 5° is 9.437 µm. For example, the radius of the spot in the spot diagram for half FOV of 15° is 26.91 µm. For example, the radius of the spot in the spot diagram for half FOV of 25° is 44.68 µm. For example, the radius of the spot in the spot diagram for half FOV of 35° is 64.88 µm. For example, the radius of the spot in the spot diagram for half FOV of 45° is 90.867 µm. For example, the radius of the spot in the spot diagram for half FOV of 50° is 107.253 µm.

The optical system provided by the present disclosure adopts an optic group including a first optic and a second optic to cooperate with a folded optical path, and a wide FOV and a long eye relief can be achieved with good image quality by configuring the focal length of the optical system, the effective aperture of the optic group, the curvature radius of the aspheric surface, the thickness of the two optics, and the distance between the two optics.

Figure 7:
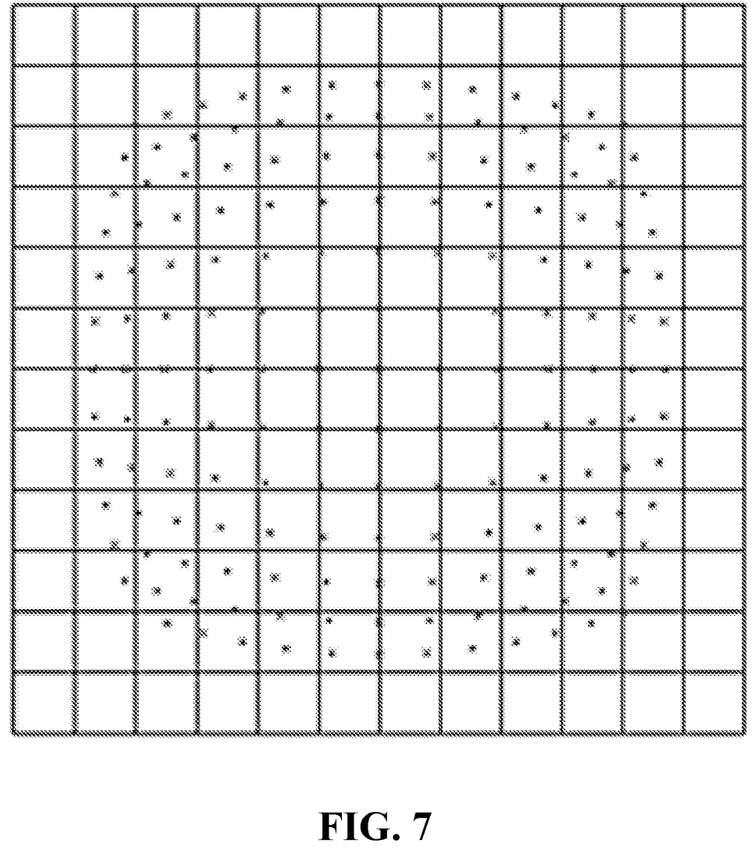
FIG. 7 is a distortion diagram of an optical system provided by an embodiment of the present disclosure.

FIG. 7 is a distortion diagram of an optical system provided by an embodiment of the present disclosure. Distortion is a parameter in the optical system, and is one of the important factors that limit the accuracy of optical measurement. It is the degree of distortion of the image formed by the optical system relative to the object itself. FIG. 7 illustrates the degree of distortion of the optical system, for example, the optical system produces a negative distortion. The optical system provided by the present disclosure can improve the overall designing freedom by configuring the surface structures of the two optics, so that the distortion of the optical system in the maximum FOV is no more than −34%, for example, the distortion of the optical system in the maximum FOV can be −33.23%, therefore the optical system meets the distortion requirements of images as formed in general VR products, and the virtual images as formed involve poor degree of distortion.

Figure 8:
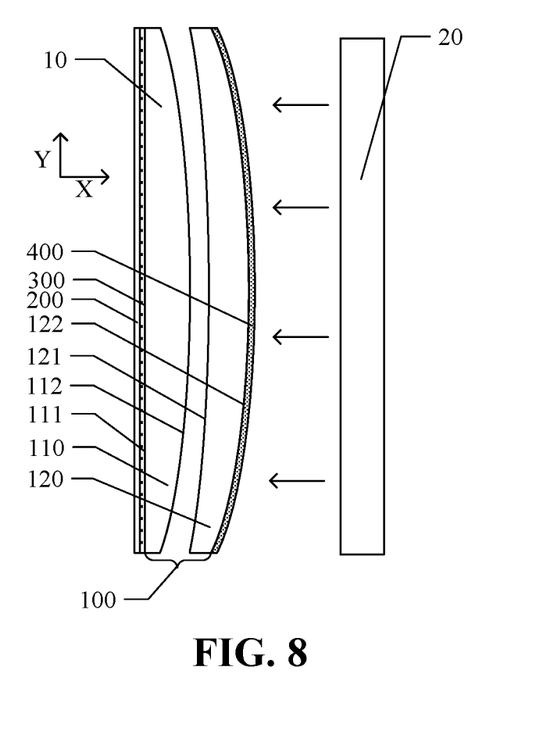
FIG. 8 is a schematic structural diagram of a display device provided according to an embodiment of the present disclosure.

FIG. 8 is a schematic structural diagram of a display device provided according to an embodiment of the present disclosure. As illustrated in FIG. 8, the display device includes a display screen 20 and the optical system 10 illustrated in the above embodiments. The display screen 20 is located at a side of the second optic 120 away from the first optic 110.

For example, a display surface of the display screen 20 is located at a focal plane of a light incident side of the optical system 10.

In some examples, as illustrated in FIG. 8, the distance between the third aspheric surface 122 and the display surface of the display screen 20 is 12 mm to 15 mm. For example, the distance between the third aspheric surface 122 and the display surface of the display screen 20 is 12.5 mm to 14.5 mm. For example, the distance between the third aspheric surface 122 and the display surface of the display screen 20 is 13 mm to 14 mm. For example, the distance between the third aspheric surface 122 and the display surface of the display screen 20 is 12.8 mm to 13.5 mm. For example, the distance between the third aspheric surface 122 and the display surface of the display screen 20 is 13.2 mm.

In some examples, as illustrated in FIG. 8, the distance between the plane surface 111 of the first optic 110 and the display surface of the display screen 20, such as the total track length (TTL), is 24 mm to 26 mm. For example, the total track length TTL includes the total optical length, which refers to the distance from the first surface of the optic group 100 to the image plane.

For example, the distance between the plane surface 111 of the first optic 110 and the display surface of the display screen 20 is 25 mm. For example, the distance between the plane surface 11 of the first optic 110 and the display surface of the display screen 20 is 24.5 mm to 25.5 mm. For example, the distance between the plane surface 111 of the first optic 110 and the display surface of the display screen 20 is 24.4 mm to 24.7 mm. For example, the distance between the plane surface 111 of the first optic 110 and the display surface of the display screen 20 is 24.8 mm to 25.2 mm.

According to the display device provided by the present disclosure, the optic group is configured as two optics including three aspheric surfaces, and parameters such as the focal length, the effective aperture, the curvature radius of each aspheric surface, the thickness of each optic, the distance between the two optics, the refractive index of each optic and the like are set; at the same time, the polarizing transflective film and the phase retardation film are provided at one side of the optic and the transflective film is provided at the other side of the optic, so that the light rays can be "folded", and the focal length of the optical system can be greatly reduced. Based on a reduced size of the optical system, the maximum angle of FOV of the optical system can reach more than 100°, while the eye relief can reach 15 mm or more, and the image distance of the virtual image as formed can reach 2000 mm; thereby shortening the TTL of the optical system to 25 mm, which is beneficial to improving the viewing experience of myopia users wearing glasses and reducing the volume of the display device.

In some examples, the maximum size of the display surface of the display screen 20 is 2 inches to 3 inches. For example, the maximum size of the display surface of the display screen 20 is 2.5 inches. For example, the display surface of the display screen 20 may have a shape of rectangle, and the size of the diagonal line of the rectangle may be 2.5 inches.

For example, the display screen 20 can be any type of display screen such as a liquid crystal display screen, an organic light emitting diode display screen, an inorganic light emitting diode display screen, a quantum dot display screen, a projector (such as an LCOS micro projector), and the like.

For example, the display device may be a VR display device.

For example, the display device may be a near-eye display device, which may be a wearable VR helmet, VR glasses, etc., and embodiments of the present disclosure are not limited thereto.

For example, the near-eye display device can be a wearable AR helmet, AR glasses, etc., and the embodiment is not limited thereto.

The following statements should be noted:

(1) In the accompanying drawings of the embodiments of the present disclosure, the drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto, and the protection scope of the present disclosure should be based on the protection scope of the claims.

The invention claimed is:

1. An optical system, comprising:
   an optic group, comprising a first optic and a second optic which are arranged one on top of the other;
   a polarizing transflective film, arranged at a side of the first optic away from the second optic;
   a phase retardation film, arranged between the polarizing transflective film and the first optic;
   a transflective film, arranged at a side of the second optic away from the first optic,
   wherein the first optic comprises a plane surface and a first aspheric surface, and the second optic comprises a second aspheric surface and a third aspheric surface, the second aspheric surface is located at a side of the first aspheric surface away from the plane surface, and the third aspheric surface is located at a side of the second aspheric surface away from the first optic; both of the first aspheric surface and the third aspheric surface are convex surfaces, the second aspheric surface is a concave surface, and a side of the plane surface away from the first aspheric surface is a light exiting side of the optic group; and
   a focal length of the optical system is 26 mm to 30 mm, an effective aperture of the optic group is 55 μm to 58 μm, a curvature radius of the first aspheric surface is −120 mm to −140 mm, a curvature radius of the second aspheric surface is −175 mm to −185 mm, and a curvature radius of the third aspheric surface is −100 mm to −110 mm.

2. The optical system according to claim 1, wherein a maximum thickness of the first optic is 4 mm to 6 mm, a maximum thickness of the second optic is 3.5 mm to 5.5 mm, and a distance between the first optic and the second optic is 2 mm to 6 mm.

3. The optical system according to claim 1, wherein an eye relief of the optical system is 13 mm to 21 mm.

4. The optical system according to claim 3, wherein the eye relief of the optical system is not smaller than 15 mm.

5. The optical system according to claim 3, wherein a maximum angle of field of view (FOV) of the optical system is 100° to 110°.

6. The optical system according to claim 1, wherein a focal length of the first optic is 220 mm to 250 mm, and a focal length of the second optic is 400 mm to 450 mm.

7. The optical system according to claim 1, wherein a refractive index of the first optic is the same as a refractive index of the second optic.

8. The optical system according to claim 7, wherein the refractive index of the first optic and the refractive index of the second optic both are 1.5 to 1.6.

9. The optical system according to claim 1, wherein a radius of a spot in a spot diagram of the optical system for central field of view (FOV) is smaller than a radius of an Airy spot of the optical system.

10. The optical system according to claim 1, wherein the phase retardation film and the polarizing transflective film are attached onto the plane surface.

11. The optical system according to claim 2, wherein an eye relief of the optical system is 13 mm to 21 mm.

12. The optical system according to claim 2, wherein a focal length of the first optic is 220 mm to 250 mm, and a focal length of the second optic is 400 mm to 450 mm.

13. The optical system according to claim 2, wherein a radius of a spot in a spot diagram of the optical system for central field of view (FOV) is smaller than a radius of an Airy spot of the optical system.

14. A display device, comprising a display screen and the optical system according to claim 1, wherein
   the display screen is located at a side of the second optic away from the first optic.

15. The display device according to claim 14, wherein a distance between the third aspheric surface and a display surface of the display screen is 12 mm to 15 mm.

16. The display device according to claim 15, wherein a distance between the plane surface and the display surface is 24 mm to 26 mm.

17. The display device according to claim 14, wherein a size of a display surface of the display screen is 2 inches to 3 inches.

* * * * *